Feb. 14, 1933.  G. BOROCKI  1,897,885
UNIVERSAL HOEING AND CULTIVATING MACHINE
Filed June 24, 1930
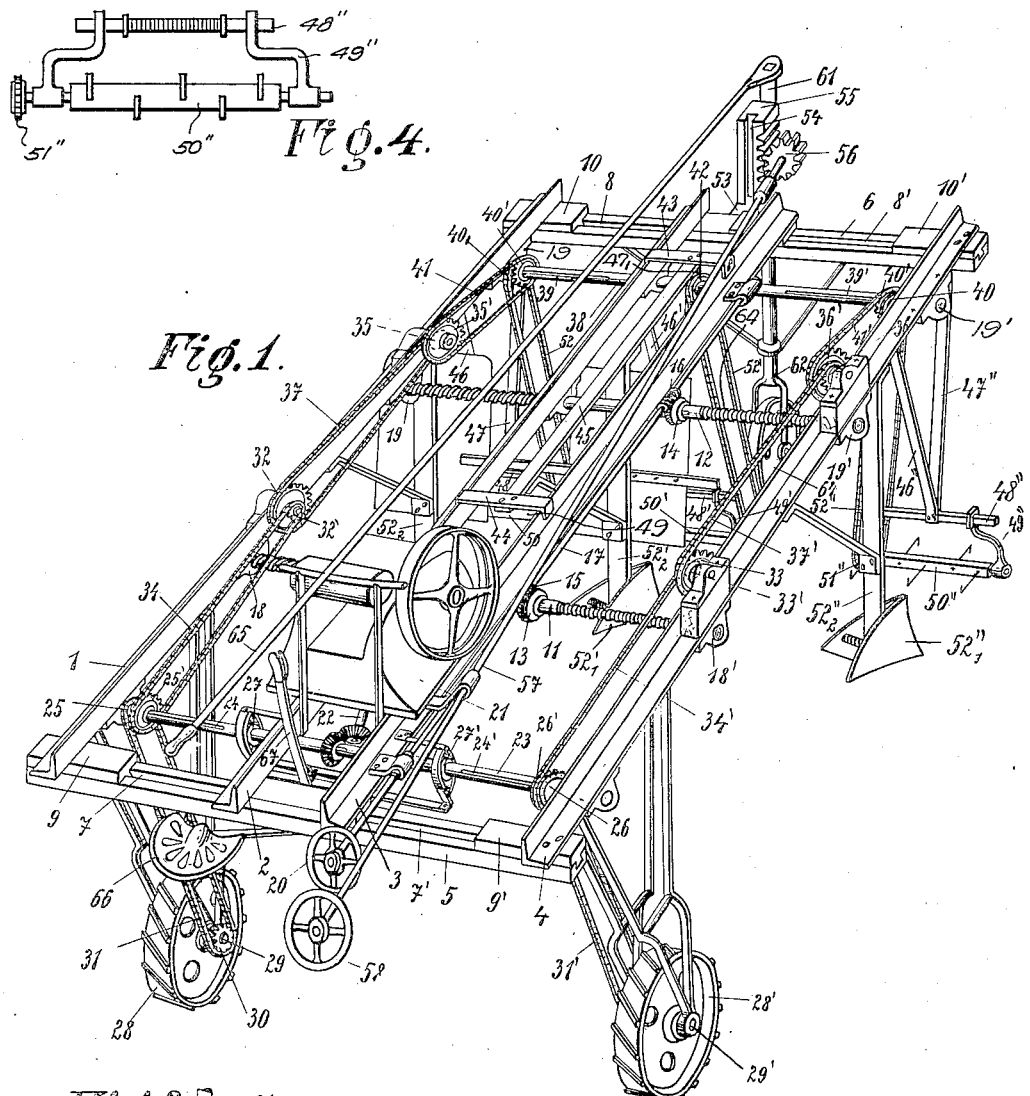
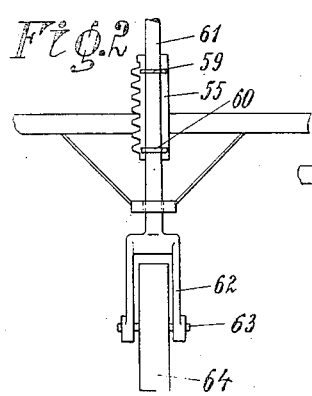
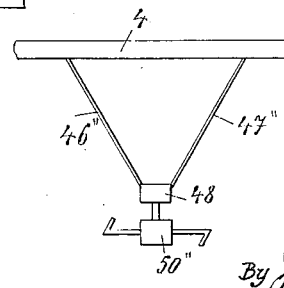
Inventor,
G. BOROCKI,
By J. E. M. Fetherstonhaugh
Attorney.

Patented Feb. 14, 1933

1,897,885

UNITED STATES PATENT OFFICE

GEORG BOROCKI, OF VIENNA, AUSTRIA

UNIVERSAL HOEING AND CULTIVATING MACHINE

Application filed June 24, 1930. Serial No. 463,382.

The present invention relates to a universal hoeing and cultivating machine which may be used for all cultivated plants which are set out in rows, since it is within the spirit of the invention that it may be set for any desired width of furrows. The machine works in such a manner that the ground is crumbled, the weeds killed and then piled together around the stems of the plants. Three or more rows may be worked simultaneously by the machine, whereby the ground is always first crumbled with a fraiser like device.

In the drawing is shown an exemplificative embodiment of the invention wherein Figure 1 is a perspective view of the machine, Figure 2 a front view of the front wheel, Figures 3 and 4, the fraiser in side and front view.

The ground frame of the machine consists of six carriers (Fig. 1) 1, 2, 3, 4, 5, and 6. The carriers 5 and 6 on the carriers 2 and 3 are provided to the extreme ends with guide grooves 7, 7', or 8, 8'. The carriers 1 and 4 are connected with guide bodies 9, 9' or 10, 10', which direct the carriers 5 and 6 in the mentioned grooves 7, 7' or 8, 8'. The carriers 2 and 3, on the other hand, are fixedly connected with the carriers 5 and 6.

In order to set the distance between carriers 1, 2 or 3, 4 as desired, two cross shafts 11, 12 are placed on the carriers 2, 3 and provided in the part running to the carrier 1 with threads turning to the left and in the part running toward carrier 4 with threads turning to the right. On the shafts 11, 12 there are respectively wedged balance wheels 13, 14, each of which is connected with a worm gearing which is also wedged on a rod 17. On the shafts 11, 12 are nuts 18, 18', or 19, 19', which are in fixed connection with the carriers 1 and 2 and therefore when the shafts 11, 12 are turned, the carriers 1, 4 are pushed together or separated from each other. At the end of the rod 17 there is located a hand wheel whose function it is to cause the approach or separation of the two carriers.

On the carriers 2, 3 the electric motor is fixedly attached, from which the drive shaft 22 leads to a cross shaft 23 located on the carriers 1, 2, 3 and 4. Cross shaft 23 is provided with a wedge-shaped groove 24 in order to make possible a sliding in an axial direction of the toothed wheels slipped over the same. At the ends of the shaft 23, there are arranged within the frame double toothed wheels 25, 25' or 26, 26'. Further, the shaft 23 carries two brake shoes 27, 27'. On the carriers 4 are fixedly arranged tread wheels 28, 28', where the latter are wedged on shafts 29, 29'. Each of the two shafts 29, 29' has wedged on it a toothed wheel 30, which is connected to toothed wheels 25, 26 by a chain, each, 31, 31'. On the carriers 1 and 4, above shaft 11 are arranged two other pairs of toothed wheels 32, 32' and 33, 33' of different sizes, the wheels 32' or 33' being also connected with wheels 25' or 26' by means of a chain 34 or 34'. Above the shaft 12 are also placed two more pairs of toothed wheels, 35, 35' and 36, 36' on the carriers 1 and 4, the toothed wheel 35 being connected with toothed wheel 32, or the toothed wheel 36 with the toothed wheel 33, by means of chains 37, 37', respectively. Near the cross-carrier 6 there is provided another cross shaft 38 which is led into the grooves of carriers 1, 2, 3, and 4 and which is provided with a guiding groove 39, or 39', in the parts reaching the carrier 4, and with pairs of toothed wheels 40, 40₁, 40', and 40₁', which are wedged on the shaft 38, attached to the carriers 1 or 4, make possible an axial movement. The toothed wheels 40, 40' are connected respectively with the toothed wheels 35' or 36', by chains 41 or 41', respectively. In addition, another toothed wheel 42 is disposed in the middle of shaft 38.

The carriers 2, 3 carry two small cross carriers 43, 44 which are connected in the middle by means of a short longitudinal carrier 45. Each of the outer carriers 1 and 4, as well also as the short longitudinal carrier 45 has disposed on it a triangular carrier 46, 47, 46', 47', 46'', 47''. The three mentioned triangular carriers each receives a short cross carrier 48, 48', 48'', which, for its part, carrier a frame 49, 49', 49''. At the lower end of each of the frames 49, 49', 49'' is located a cutter shaft 50, 50', 50'', each of which has a toothed wheel 51, 51', 51" wedged on its end. Each of the toothed wheels 51, 51', 51" is connected by a chain 52, 52', 52" with the toothed wheels $40_1$, 42 or $40_1'$. The cutters are exchangeably arranged on the cutter shaft 50. Around the cutter shaft are advantageously arranged suitably attached tin hoods, in order to prevent the whirled up earth from being thrown up. Immediately behind the cutter shafts, plowshares, $52_1$, $52_1'$, $52_1''$, are disposed on suitable carriers $52_2$, $52_2'$, $52_2''$, carried on carriers 1, 45 and 4.

On the cross carrier 6 is attached a guide member 53 from which a rack 55 provided with a vertical groove receives guidance. With the rack 55 is geared a cog wheel 56 which is wedge seated on a rod 57 and which may be turned by means of a hand wheel 58 located at the end of rod 57. By means of two rings 59, 60, the rack 57 is connected in such a manner with a vertical axle 61, which carries the front wheel fork 62, that this axle may turn on its one axis and in so doing may remain in its vertical position, by means of the rings 50, 60. The front wheel fork 62 carries the axle 63 for the front wheel 64. At the upper end of the vertical axle 61 there is set a hand lever 65, which makes possible the turning of the front wheel from the driver's seat 66. From the seat 66, not only can the hand lever 65 be operated, but also the mentioned hand wheel 20 for changing the position of carriers 1 and 4, as well as the hand wheel 58 for setting the height of the frames, and finally, also the motor 21 and the brake shoe 67.

Motor 21 serves, on the one hand, to set the machine in motion and on the other, for actuating the cutter shafts 50, 50', 50". The first is done in such a manner that the drive shaft 22 drives the cross shaft 23, so that the cog wheels 25, 25', or 26, 26', rotate; the cog wheels 25 and 26 serve to actuate the rear wheels 28, 28', while the cog wheels 25' and 26', drive the cross shaft 38 by means of suitable gear transmission, and by means of the cog wheels $40_1$, 42 and $40_1'$ wedged on the same, drive the cog wheels 51, 51', 41" seated on the cutter shafts.

The machine may, under circumstances, find utilization also as a tractor or as a locomobile (motor). For shallow plowing, four plowshares may be used, for deeper plowing, two plowshares. The machine can also be used as a locomobile, if the flywheel of the motor is constructed as a strap wheel, and therefore the same motor may be used for threshing, picking grapes, wood cutting, grinding, and the like.

I claim:

1. A hoeing and cultivating machine comprising a plurality of longitudinal members, drive wheels and driven weed cutters carried on the outer longitudinal members, a pair of lateral rotatable shafts carried on the inner longitudinal members and threaded through the outer longitudinal members and means for rotating the shafts.

2. A hoeing and cultivating machine comprising a plurality of longitudinal members, drive wheels and weed cutters carried on the outer longitudinal members, means for adjusting the outside longitudinal members laterally, a front and rear cross driving shaft, means for driving the front shaft from the rear shaft, means for driving the driving wheels from the rear shaft and means for driving the weed cutters from the front shaft irrespective of the adjustment of the outer longitudinal members.

GEORG BOROCKI.